Figure 4:
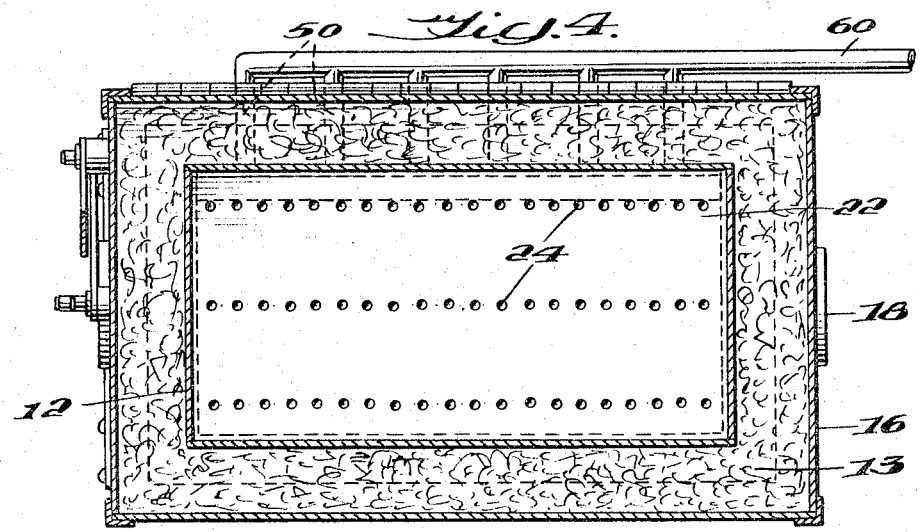

March 28, 1967 M. F. TORRENCE 3,311,360
AIR AGING OVEN APPARATUS
Filed Oct. 29, 1964 3 Sheets-Sheet 1
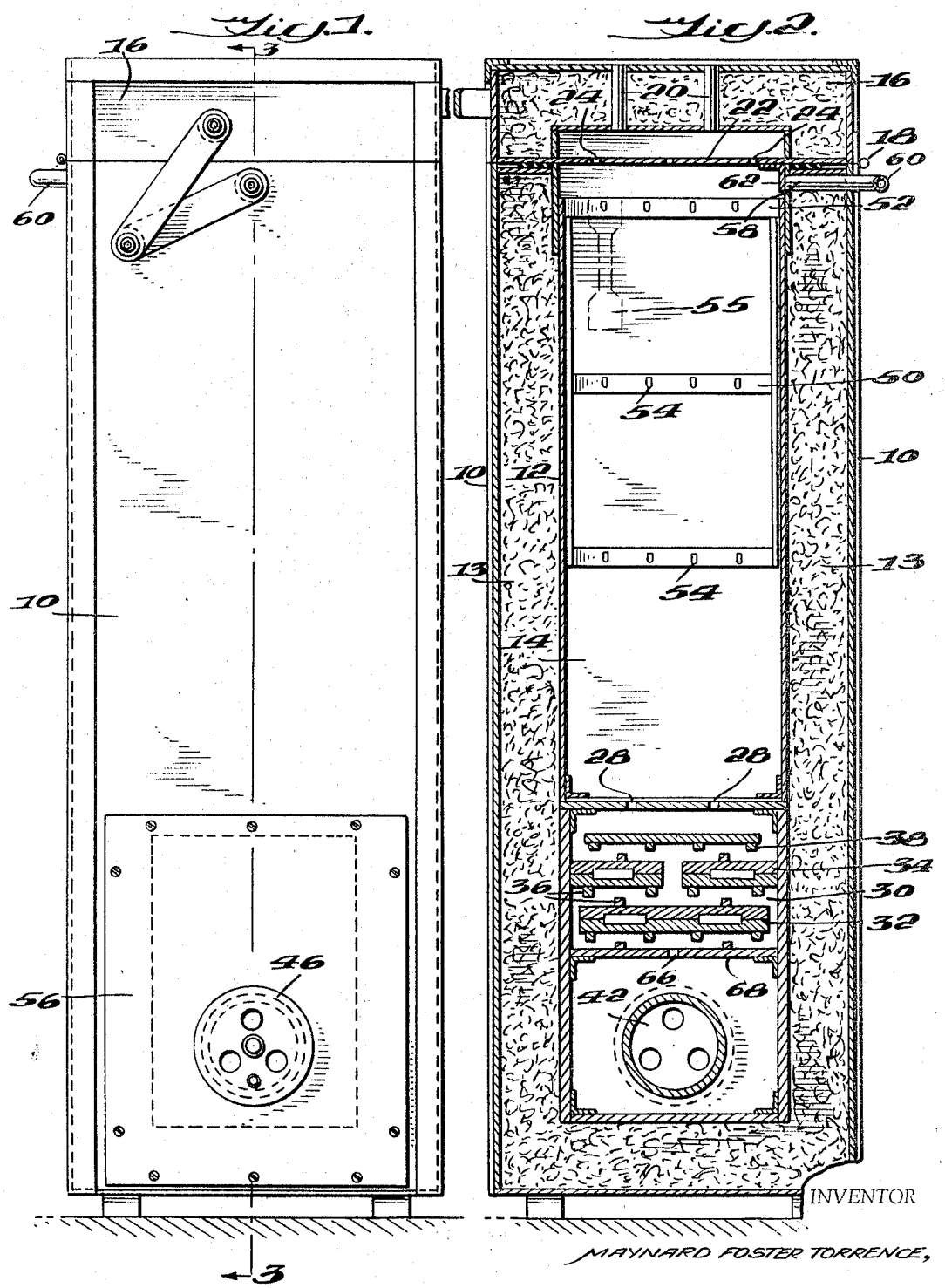
INVENTOR
MAYNARD FOSTER TORRENCE, March 28, 1967  M. F. TORRENCE  3,311,360
AIR AGING OVEN APPARATUS
Filed Oct. 29, 1964  3 Sheets-Sheet 2
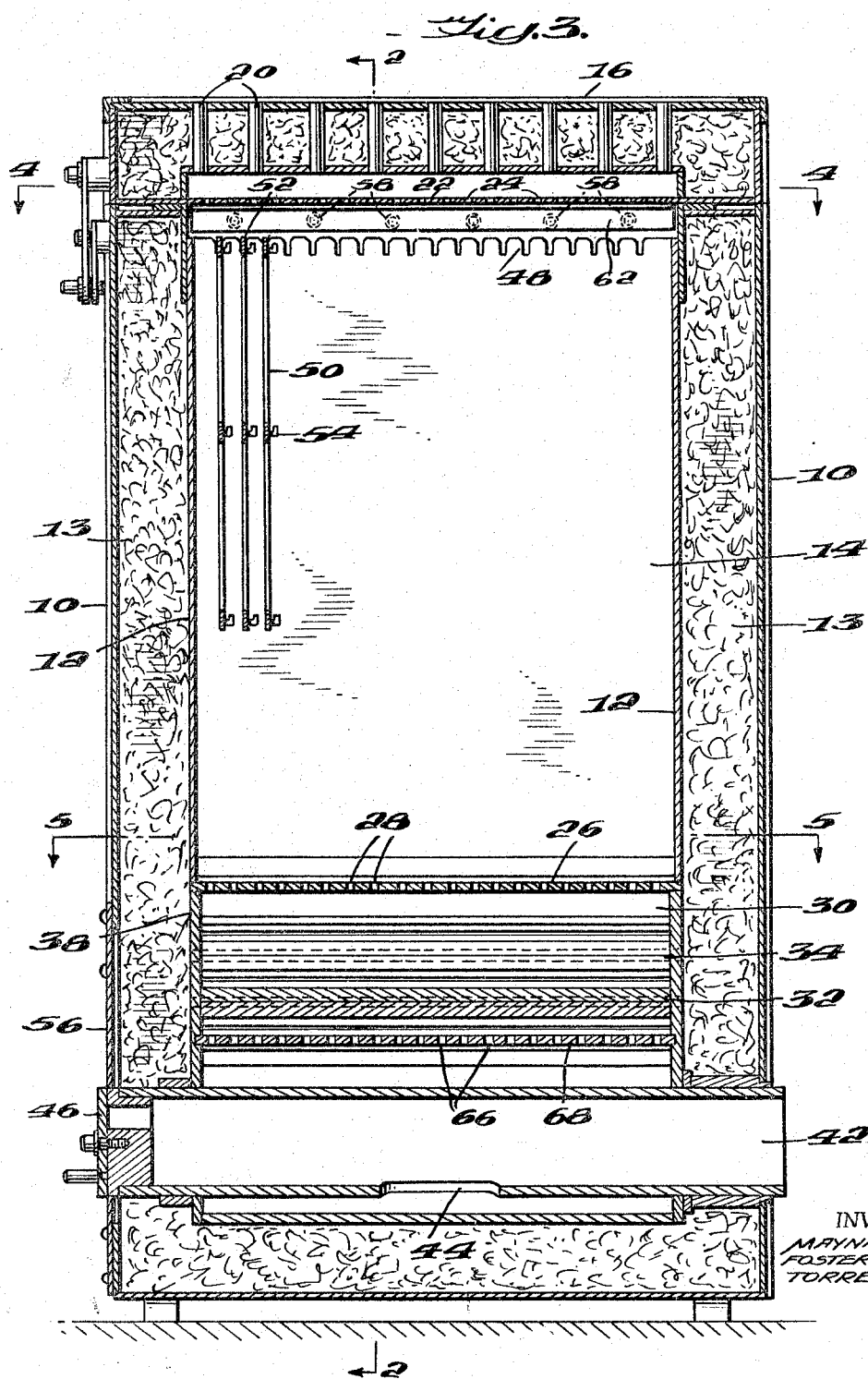
INVENTOR
MAYNARD
FOSTER
TORRENCE,

INVENTOR
MAYNARD FOSTER TORRENCE,

United States Patent Office 3,311,360
Patented Mar. 28, 1967

3,311,360
AIR AGING OVEN APPARATUS
Maynard Foster Torrence, Wilmington, Del., assignor to E. I. du Pont de Nemours and Company, Wilmington, Del., a corporation of Delaware
Filed Oct. 29, 1964, Ser. No. 407,414
6 Claims. (Cl. 263—40)

The present invention relates generally to an air aging oven. More particularly, it is concerned with a novel apparatus for use in determining at an accelerated rate the resistance of materials to hot air aging treatment.

All rubber-like materials or elastomers whether natural or synthetic are subject to age deterioration. Aging is a complex process involving, among other things, the chemical composition of the elastomer, the atmospheric conditions to which it is exposed, heat and light. The changes that take place in rubber compounds during the aging process are varied; there may be a reduction in the length and weight of the polymers making up the rubber, cross-linking of the polymer chains, and chemical alteration of the molecule by incorporation of new chemical groups. Frequently, protective agents are added to inhibit the degrading processes the elastomers undergo. In order to better understand the cause and effects of age deterioration, and protect against these processes, the rubber industry is expending a great deal of effort in developing techniques in which natural aging conditions are simulated at an accelerated rate in the laboratory. Aging tests are now commonly a part of specifications for elastomeric compounds.

The basic technique which has heretofore been used in performing accelerated aging tests on elastomers has been to force a stream of heated air over samples hung in the chamber of an oven. The difficulties encountered in this aging process are well known in the art. The air flow frequently varies throughout the oven chamber which destroys uniformity in the test conditions. In most ovens the air is recirculated. When samples of different compositions are exposed in a recirculatory type oven, volatile materials may be picked up in the recirculating air and contaminate some of the other samples, either increasing or decreasing their resistance to high temperature aging. The same volatile materials are often deposited on the inside of the oven and contaminate samples aged at a later time. In the conventional oven, variations in results are also caused by obstruction of the air flow by samples placed near the inlet side. This combination of effects has resulted in non-reproducibility and non-uniformity in the test results which have long been a problem in the industry.

In an attempt to overcome these shortcomings, some ovens have been equipped with tubular systems in which the samples are placed in tubes which extend through the oven chamber. This separates the test specimens, prevents cross contamination, and enables the air flow through the tubes to be accurately measured. These changes result in some improvement in reliability of the test results. However, the tube-type ovens are cumbersome to load and operate and the installation of tubes in the oven chamber results in a much reduced sample capacity.

The present invention relates to a non-recirculatory heated air convection type oven in which the test samples are suspended vertically in the oven chamber. More particularly, it relates to an oven comprising a chamber having a plurality of inlet holes in its bottom wall through which fresh heated air is introduced into the oven chamber. Test samples are suspended vertically on racks from near the top into said chamber in such a manner that the air passes over the samples and exhausts through a plurality of air ports in the top wall of the chamber. The air inlet holes, samples, and outlet ports are positioned in relation to each other so that the air issuing from the inlet holes rises vertically in a curtain of air over the speciments on one rack with a minimum of turbulence and without passing over the samples of adjacent racks.

Further details and advantages of the invention will be understood from the following description of the preferred embodiment of the invention shown in the accompanying drawings forming a part of this specification.

Figure 5:
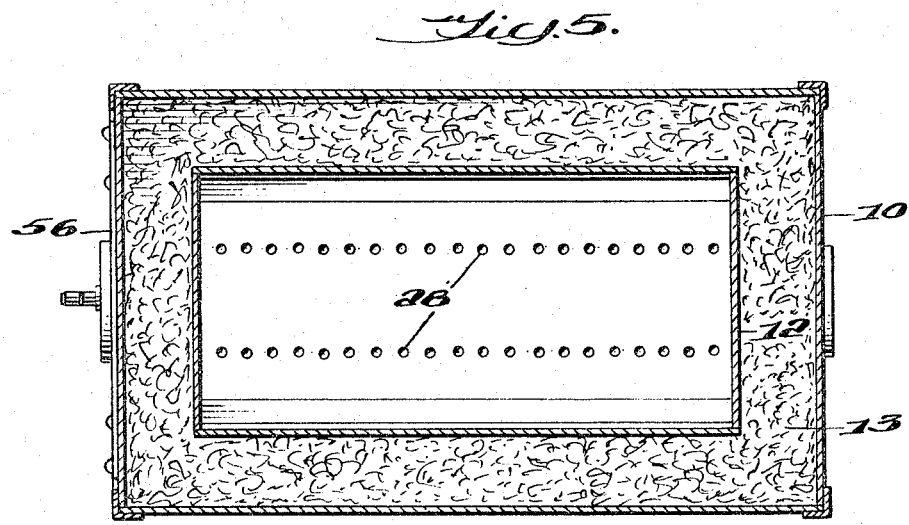
Figure 6:
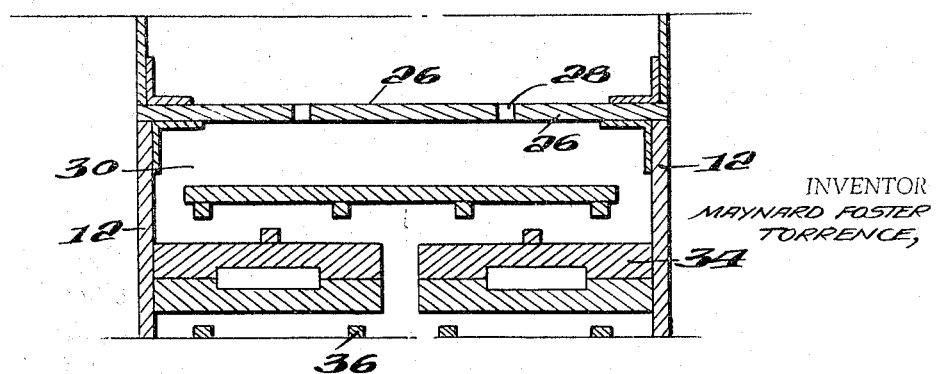

In the drawings:
FIG. 1 is a side elevational view of the outside of the oven.
FIG. 2 is a cross-sectional side elevational view of an oven embodying the present invention taken along line 2—2 of FIG. 3.
FIG. 3 is a front cross-sectional elevational view taken along line 3—3 of FIG. 1.
FIG. 4 is a view taken on line 4—4 of FIG. 3.
FIG. 5 is a view taken on line 5—5 of FIG. 3.
FIG. 6 is an enlarged view of a portion of FIG. 2 showing in detail the heating and baffle elements of the present invention.

Referring now to the drawings and more particularly to FIGS. 2 and 3 thereof, there is shown an outer casting 10, an inner casing 12 with insulation 13 between. The inner part of said casing 12 forms a chamber 14 accessible through insulated cover 16 attached to the outer casing by means of hinge 18. It will be noted that cover 16 is provided with two rows of 7/16" air exhaust openings 20. As will be seen most clearly from FIG. 3, the upper and lower walls of interior chamber 14 are defined respectively by top plate 22 which opens with cover 16 and bottom plate 26. In the embodiment shown, the bottom plate 26 has two rows of inlet holes 28, 1/4" diameter through which air is admitted into the chamber 14. Top plate 22 has three rows of outlet ports 24 (see FIG. 4), 1/4" diameter, spaced the same distance apart along the long dimension as they are in the bottom plate. The extra row of ports in the top plate prevents pressure build-up inside the oven. An equally effective alternative is to have the same number of holes in the top but increase their size. The insulated cover 16 with its eighteen openings 20 for final exhaustion of the air is about one inch above top cover plate 22.

Immediately below the oven chamber 14 is an air heating region 30 (FIG. 2). The heating region 30 is equipped with longitudinally extending lower and upper electrically heated slabs 32 and 34, respectively. Baffles 36 are mounted both on the top and bottom of heaters 32 and 34 with additional baffles 38 situated near the top of said heating region.

As will be seen most clearly from FIG. 3 at the bottom and running lengthwise through the oven is an air manifold 42 having a slot 44 midway in its length to supply air to the oven. Alternatively, a series of holes or slots may be used instead of slot 44. The manifold is equipped with an air regulator 46 external of the oven to control the velocity of the air issuing from slot 44. A service entrance 56 (FIG. 1) is provided for easy accessibility to the heating and air supply elements.

Now returning to the oven chamber, as best shown in FIGS. 2 and 3, it will be seen that the casing 12 forming the inner wall of said chamber is provided with notches 48 at its top. Tiered sample racks 50 having abutting shoulders 52 adapted for insertion into said notches are suspended therefrom in rows within said oven chamber; said racks being provided with pins 54 on which the test samples 55 are hung. In the particular embodiment illustrated, each rack holds four sets of three speciments such that three specimens of the same compounds are hung on racks one above the other. Two hundred and fifty-two specimens are exposed at the same time in a chamber 7⅜ inches wide, 16⅜ inches long and 27 inches high. Special hangers may be provided to expose odd-shaped and larger specimens such as compression set jigs.

A very important feature of the present invention is the spatial relationship of the air inlet holes 28, samples, and air outlet ports 24. For proper operation of the oven, it is necessary that the air issuing from holes 28 rise vertically between and over the test samples in a curtain of air and out the top plate ports 24. In order to achieve this effect the inlet holes 28 and outlet ports 24 are in alignment in the same vertical plane transverse to the direction of the rows. The racks are suspended so that the samples are between two such vertical planes, i.e., between two inlet holes and two outlet ports along the rows, and are thus between two streams of air. The flow of air between the rows of samples is laminar and there is a minimum of obstruction between the inlet holes and outlet ports. Since the temperature of the air and the samples is constant throughout, there is very little, if any, volatilization with subsequent deposition between specimens. It will be noted that the above specifications require that there be at least one more inlet hole 28 and outlet port 24 in each longitudinal row than there are notches 48 in the casing 12.

An equally effective alternative arrangement is to have the inlet holes 28 as they were described above but position the outlet ports 24 directly above the pins 54 on which the test samples are hung. Such an arrangement would require the same number of outlet ports 24 as there are notches 48.

In the actual operation of the oven, warm air from the air supply manifold 42 is forced through the slot 44 into the bottom of the oven. The air is introduced into the heating region through openings 66 in partition 68. This stream of air is heated as it is circulated around the series of electrically heated baffles 32 and 34 and delivered into the oven chamber through air passage holes of bottom plate 26. The onrushing air rises vertically in a curtain of air over and between the rows of samples hung on racks 50. It will be seen that when the oven is used for aging sheet test specimens, the air passes parallel with the surface over only three specimens normally of the same compound. After the air has passed entirely through the chamber it exhausts through ports 24 in top plate 22 and then is expelled through the openings 20 in cover 16.

The velocity of the air may be measured at any one of the exhaust openings 20 in the cover. The temperature is controlled through the use of variable resistance devices and an "on and off" control. The lower baffles 32 are adjusted so that they are on constantly. The "on and off" control (not shown) operates the top heaters through a variable resistance device. Under these conditions, a single point in the oven varies less than 0.5° C. over a period of several weeks. Variation in the temperature from the top to the bottom of the oven will normally be within ±1° C. The temperature recovers very rapidly after the oven is opened to place or remove samples.

Several ovens can be placed side by side in a series with a common air supply. The velocity of the air can be controlled either by using a rotating sleeve on the manifold drilled with holes through both the sleeve and the manifold, or in the case of a one oven unit by dampers on the air supply to the manifold and at the other end.

The oven of the present invention can optionally be equipped with an exhaust near the top of the chamber that will operate when the lid is opened bringing air in from the top to remove toxic fumes and prevent hot air from coming in contact with the operator. This would be necessary only for the upper limits of temperature or where unusual compositions are aged. As shown by the accompanying drawings, the exhaust system consists of six ducts 58 leading from the inside of the oven chamber just below the top plate, to a common exhaust manifold 60 running along the rear of the oven. Damper 62, fastened to the under-side of top plate 22, closes over the ducts 58 when cover 16 is closed to seal them off during operation of the oven. When the cover 16 is opened the fumes are drawn out through the ducts 58 and discharged from the oven by an exhaust fan not shown.

An important advantage of the present invention is that the curtain of air passing between the samples allows them to be placed close together so more specimens can be exposed in a given area. A further advantage is the top opening design of the oven with the sample racks being suspended from the top of the oven chamber immediately below the cover allows easier loading and unloading with less exposure of the operator to hot air and metal. Lastly, in the event that it is necessary to separate the samples completely from each other, as when samples containing highly volatile materials are used together, dividers can replace the sample racks to subdivide the chamber.

While there is shown and described herein certain specific structures embodying the invention, it will be manifest to those skilled in the art that various modifications and rearrangements of the parts may be made without departing from the spirit and scope of the underlying inventive concept, and that the same is not limited to the particular forms herein shown and described except insofar as indicated by the scope of the appended claims.

What is claimed is:

1. In an aging oven, a rectangular casing, said casing having an air heating region and an oven chamber immediately above and communicating with said heating region through at least one row of inlet holes in the lower wall of said chamber, means for propelling air through said inlet holes, removable cover means at the top of the chamber having at least one row of outlet ports to discharge heated air therefrom, said outlet ports having a greater total air flow capacity than said inlet holes in the lower wall; said outlet ports and inlet holes being in alignment in the same vertical plane transverse to the direction of the rows, rack means supported by said rectangular casing near the top of said chamber, said rack means being provided with suspension pins for suspending test samples vertically into said chamber, said pins being positioned such that each pin and test sample suspended therefrom is between two adjacent inlet holes along the rows.

2. An aging oven as described in claim 1 wherein there are two rows of inlet holes and said rack means and suspension pins are adapted to suspend four rows of test samples longitudinally through the oven chamber such that the individual holes of one of said rows of holes are centered between adjacent suspension pins of the first and second rows of samples and the individual holes of the other row of holes are centered between adjacent suspension pins of the third and fourth rows of samples.

3. In an aging oven, a rectangular casing, said casing having an air heating region and an oven chamber immediately above and communicating with said heating region through at least one row of inlet holes in the lower wall of said chamber, means for propelling air through said inlet holes, removable cover means at the top of the chamber having at least one row of outlet ports to discharge heated air therefrom, said outlet ports having a greater total air flow capacity than said inlet holes in the lower wall, rack means supported by said rectangular casing near the top of said chamber, said rack means being provided with suspension pins for suspending test samples vertically into said chamber, said pins being positioned such that each pin and test sample suspended therefrom is between two adjacent inlet holes along the rows and the individual outlet ports are in the same vertical plane as the test samples.

4. An aging oven as described in claim 3 wherein there are two rows of inlet holes, said rack means and suspension pins are adapted to suspend four rows of test samples longitudinally through the oven chamber such that the individual holes of one of said rows of holes are centered between adjacent suspension pins of the first and second rows of samples and the individual holes of the other row of holes are centered between adjacent suspension pins of the third and fourth rows of samples.

5. In an aging oven, a rectangular casing said casing providing an air heating region and an oven chamber immediately above and communicating with said heating region through at least one row of air inlet holes in the lower wall of said chamber, means for circulating fresh heated air through said heating region and into said oven chamber through said inlet holes, a hinged cover at the top of said oven chamber, said cover being provided with a plate forming the upper wall of said chamber and having at least one row of outlet ports to discharge the heated air, said outlet ports having a greater total air flow capacity than said inlet holes in the lower wall; said outlet ports being in alignment with said inlet holes in the same vertical plane transverse to the direction of the rows, tiered sample racks supported by said rectangular casing near the top of said chamber, said rack means being provided with suspension pins for suspending test samples vertically into said chamber, said pins being positioned such that each pin and test sample suspended therefrom are between two adjacent inlet holes along the row.

6. An oven as described in claim 5 wherein exhaust duct means are provided in communication with said chamber beneath said upper wall.

References Cited by the Examiner
UNITED STATES PATENTS 1,950,246 3/1934 Hyland _____ 219—400 X
2,018,505 10/1935 Suhr _____ 263—43 X FREDERICK L. MATTESON, JR., *Primary Examiner.*

JOHN J. CAMBY, *Examiner.*